United States Patent [19]

Chu

[11] Patent Number: 4,934,799
[45] Date of Patent: Jun. 19, 1990

[54] MULTI-LENS FOCUSSING ARRANGEMENT FOR LASER GRAPHICS IMAGING APPARATUS

[75] Inventor: Moo J. Chu, Chungnam, Rep. of Korea

[73] Assignee: Korea Electronics & Telecom. Research, Chungnam, Rep. of Korea

[21] Appl. No.: 272,935

[22] Filed: Nov. 18, 1988

[30] Foreign Application Priority Data

Nov. 26, 1987 [KR] Rep. of Korea ............... 87-13364

[51] Int. Cl.$^5$ ............... G02B 27/00; G02B 21/12; G02B 27/12; G02B 15/14
[52] U.S. Cl. ............... 350/501; 350/527; 350/521; 219/121.75; 219/121.83
[58] Field of Search ............... 350/501, 507, 527, 521, 350/518, 524, 174; 219/121.75, 121.83, 121.68

[56] References Cited

U.S. PATENT DOCUMENTS

| | | | |
|---|---|---|---|
| 3,096,767 | 7/1963 | Gvessev et al. | 350/527 |
| 4,289,378 | 9/1981 | Remy et al. | 219/121.83 |
| 4,515,445 | 5/1985 | Muller et al. | 350/527 |
| 4,515,447 | 5/1985 | Weimer et al. | 350/527 |
| 4,523,799 | 6/1985 | Delhaye et al. | 350/527 |
| 4,573,467 | 3/1986 | Rich et al. | 219/121.75 |
| 4,634,240 | 1/1987 | Suzuki et al. | 350/527 |

*Primary Examiner*—Jon W. Henry
*Attorney, Agent, or Firm*—Evenson, Wands, Edwards, Lenahan & McKeown

[57] ABSTRACT

An arrangement for focussing a laser beam onto the imaging surface of a laser graphics imaging apparatus includes a viewing stage having a focussing lens and an associated eye lens that are mutually displaceable along a first optical axis through which the imaging surface is monitored in the course of the formation of a laser graphics pattern. Coupled with the viewing stage is a laser-beam imaging stage having a beam diameter adjustment lens and a beam splitter disposed along a second optical axis which intersects the first optical axis. The location of the beam splitter is such that a laser beam incident along the optical axis of the laser beam-imaging stage is directed through and focussed by the focussing lens onto the imaging surface. Displacement of the beam diameter adjustment lens causes the diameter of the pattern-forming laser beam to be varied. The beam splitter is disposed along the optical axis of the first stage at a location between the focussing lens and associated eye lens that is fixed relative to the imaging surface irrespective of displacement of the focussing lens and the eye lens with respect to the imaging surface. The laser beam is focussed onto the imaging surface by adjusting the displacement of the focussing lens relative to the imaging surface.

2 Claims, 1 Drawing Sheet

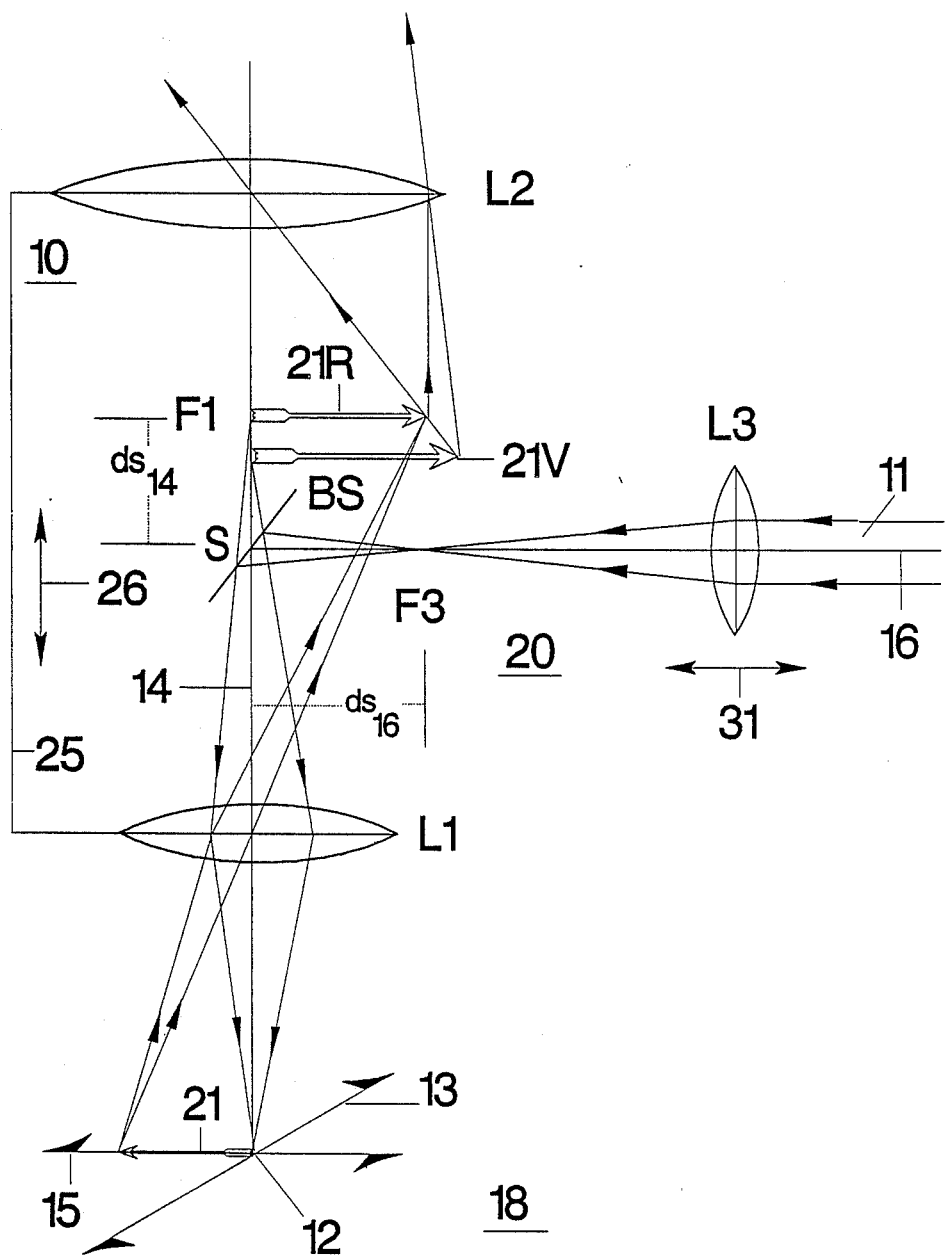

MULTI-LENS FOCUSSING ARRANGEMENT FOR LASER GRAPHICS IMAGING APPARATUS

FIELD OF THE INVENTION

The present invention relates in general to laser graphics imaging apparatus and, in particular, to a multi-lens arrangement for permitting simultaneous adjustment of the observation of a graphics pattern-forming laser beam and control of the focussing of the beam.

BACKGROUND OF THE INVENTION

Successful operation of a laser graphics imaging device requires precise control of the focussed energy of a patterning laser beam. For the typical Gaussian cross-sectional energy distribution, the minimum diameter D of the focussed spot may be determined in accordance with the expression $$D = 1.22 f\lambda/d$$

where $\lambda$ is the wavelength of the laser beam, d is the diameter of the incident light beam and f is the focal length of the focussing lens.

When the wavelength of the beam employed falls within the visible range of the optical spectrum, it is not difficult to focus the beam to have a minimum diameter on the order of 1 m$\mu$. As the beam is focussed to form a precisely controlled spot on an optically sensitive material, for example the planar surface of an optically sensitive plate, an extremely precise pattern can be formed by causing relative movement between the point or spot of incidence of the focussed laser beam and the optically sensitive material. A typical application of laser graphics image formation is semiconductor processing or maskless lithography in which a pattern is formed directly upon the material of interest without the use of a mask.

Because the optical mounting and support structure through which the laser beam is precisely controlled and focussed must be configured with extreme precision, relative movement between the optically sensitive material (upon which the pattern is to be formed) and the beam forming optics is normally achieved by way of an X-Y transport table upon which the optically sensitive material is mounted, with the focussing optics being stably secured in a substantially vibration free environment.

The line width of the graphics pattern to be formed by the focussed laser beam is affected by the focussed diameter of the incident laser beam, the exposure energy (intensity of the laser beam times exposure time), the $\gamma$-value of the optically sensitive material and its spectral response characteristic. As a consequence, in order to obtain as precise a control as possible of these values, it is necessary to provide a mechanism through which the diameter of the pattern forming laser beam, specifically the diameter of the focussed spot in which the energy of the laser beam is concentrated on the optically sensitive material can be adjusted and monitored.

In conventional laser graphics beam focussing systems. adjustment of the characteristics of the laser beam has been accomplished by the substitution of different lenses, or by adjusting the difference between the focussing lens and the optically sensitive material, followed by adjustment of the diameter of the focussed beam. In a system where different lenses are employed to adjust the diameter of the beam, it is impossible to provide for continuous control of the beam. On the other hand, where adjustment has been accomplished by varying the distance between the focussing lens and the material upon which the pattern is formed, the ability to monitor the characteristics of the focussed beam has not been readily achievable because of the location of the focussing lens, which must be continuously adjustable.

SUMMARY OF THE INVENTION

In accordance with the present invention, the above problems of conventional focussing arrangements employed for laser graphics imaging apparatus are solved by a multiple lens arrangement which integrates the monitoring function with the diameter control/focussing function of the beam control lens. To this end, the present invention involves of the insertion of a dichroic mirror in the optical path through which the laser-formed pattern is monitored. The pattern-forming laser beam is directed onto the dichroic mirror and reflected therefrom onto the optically sensitive material. In the course of its travel, the beam is focussed by a focussing lens the translation or displacement of which relative to the dichroic mirror adjusts the location of the focal point of the beam relative to the mirror and, consequently, the distance between the focal point of the lens and the optically sensitive material so as to control the diameter of the laser beam spot which is focussed on the optically sensitive material.

The incident laser beam also travels through one of the lenses of a compound lens stage through which the laser-formed graphics pattern is observable. The monitoring optics permits both the pattern and the size of the incident laser beam through which the pattern is formed to be monitored simultaneously. By displacement of the beam control lens, the characteristics of the pattern can be adjusted independently of the pattern observation optics.

BRIEF DESCRIPTION OF THE DRAWINGS

The single FIGURE is a diagrammatic illustration of a multi lens focussing arrangement for a laser graphics imaging apparatus in accordance with an embodiment of the invention.

DETAILED DESCRIPTION

Referring now to the single FIGURE, the focussing arrangement for a laser graphics imaging apparatus in accordance with the present invention is shown as comprising a microscope (viewing optics) stage 10 formed of a focussing lens L1 and an eye piece lens L2 integrally mounted in a unitary displacement mechanism diagrammatically illustrated by connection line 25, the displacement of which is in the direction of arrows 26 associated therewith, relative to a (planar) surface 11 upon which an optically sensitive material (workpiece) is disposed The apparatus further includes a (pattern forming) laser beam focussing stage 20 comprising a focussing lens L3 and a dichroic (beam-splitting) mirror BS located between lenses L1 and L2 along the optical axis 14 of microscope stage 10 and having an optical axis 16 which intersects the axis 14 of stage 10 at point S on dichroic mirror BS. Lens L3 is displaceable in a direction parallel to optical axis 16 of beam 11 in the direction of arrows 31 by a translation mechanism not shown.

The optical system formed by stages 10 and 20 is preferably housed in a stable vibration free structure, as is customary practice, so as to permit graphics pattern-forming beam 18 to be precisely focussed onto surface 11 and form thereon a precision pattern 21. Surface 11 preferably comprises a planar surface or plate of an X-Y transport system, the relative directions of movement of which are shown by arrows 13 and 15.

In the configuration shown in FIG. 1, the separation $ds_{16}$ between point S on dichroic mirror BS and focal point F3 of lens L3, when made equal to the distance $ds_{14}$ between point S on dichroic mirror and the focal point F1 of the lens L1, will result in laser beam 11 being focussed to a point 12 on the workpiece surface 11. Adjustment or displacement of the lens L3 in the direction of the optical axis 16 of the beam 11 (the direction of arrows 31) will result in an adjustment or variation in the diameter of the imaged spot 12 of the beam 11 on work surface 18. By adjustment of the microscope stage 10 (the simultaneous movement of the lens L1 and L2 in the direction of arrows 26) adjustment of the focus of the microscope stage and the image of the pattern 21 to be traced by the laser beam 11 on the work surface 18 may be monitored. By the action of lens L1, pattern 21 forms a real image 21R at the focal point F1 of lens L1 beyond or upstream of dichroic mirror BS along optical axis 14 of the microscope stage 10. Through eye piece lens L2, real image 21R is transformed into a virtual image 21V, so that the pattern 21 on the work surface 18 may be visually monitored through microscope stage 10.

Because dichroic mirror BS is located so as to cause reflective coincidence of the optical axis of the pattern-laser beam 16 and axis 14 of microscope stage monitoring optics 10. both the pattern 21 being traced by the focussed laser beam 11 and the diameter of the image spot 12 of that laser beam 11 may be viewed and controlled simultaneously. In other words, adjustment of the displacement of lens L3 in the direction of arrows 31 along optical axis 16 permits the diameter of the spot through which the pattern is formed to be adjusted and the translation of the microscope stage 10 (which controls the movement of lens L1 relative to the workpiece surface 18) controllably adjusts the focus of that spot onto the work surface 18 so as to permit the intended pattern to be precisely controlled and monitored.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. An arrangement for focussing a laser beam onto the imaging surface of a laser graphics imaging apparatus comprising:
    a first, viewing stage having a focussing lens and an associated eye lens mutually displaceable along a first optical axis through which said imaging surface may be observed; and
    a second, laser-beam imaging stage having a beam diameter adjustment lens and a beam splitter disposed along a second optical axis which intersects said first optical axis, such that a laser beam incident along the optical axis of said second stage is directed by said beam splitter along said first optical axis, so as to be incident on said imaging surface, such that displacement of said beam diameter adjustment lens causes the diameter of said laser beam as focussed by said focussing lens on said imaging surface to be varied; and wherein
    said beam splitter is disposed along the optical axis of said first stage at a location, between said focussing lens and associated eye lens, that is fixed relative to said imaging surface, and means for mutual, simultaneous displacement of said focussing lens and said eye lens with respect to said imaging surface independently of the fixed location of said beam splitter.

2. An arrangement according to claim 1, further including means for adjusting the manner in which said laser beam is focussed onto said imaging surface by adjusting the displacement of said focussing lens relative to said imaging surface.

* * * * *